(12) United States Patent
Zhou et al.

(10) Patent No.: US 11,350,286 B2
(45) Date of Patent: May 31, 2022

(54) DEVICE IDENTIFIER OBTAINING METHOD AND APPARATUS

(71) Applicant: Huawei Technologies Co., Ltd., Shenzhen (CN)

(72) Inventors: Chong Zhou, Beijing (CN); Tianfu Fu, Beijing (CN); Dacheng Zhang, Beijing (CN); Jianxiong Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 16/990,528

(22) Filed: Aug. 11, 2020

(65) Prior Publication Data

US 2020/0374696 A1 Nov. 26, 2020

Related U.S. Application Data

(63) Continuation of application No. PCT/CN2018/100618, filed on Aug. 15, 2018.

(30) Foreign Application Priority Data

Feb. 12, 2018 (CN) .......................... 201810147255.9

(51) Int. Cl.
*H04W 12/71* (2021.01)
*H04W 12/03* (2021.01)
(Continued)

(52) U.S. Cl.
CPC .......... *H04W 12/71* (2021.01); *H04L 9/0825* (2013.01); *H04L 9/3278* (2013.01);
(Continued)

(58) Field of Classification Search
CPC ............. H04W 12/71; H04W 12/0431; H04W 12/069; H04W 12/033; H04L 9/0825; H04L 9/3278
See application file for complete search history.

(56) References Cited

U.S. PATENT DOCUMENTS 9,489,504 B2   11/2016  Yang et al.
2003/0046570 A1* 3/2003  Ronkka .................. G06F 21/74
(Continued)

FOREIGN PATENT DOCUMENTS

CN    101052033 A   10/2007
CN    101640590 A    2/2010
(Continued)

OTHER PUBLICATIONS

Zhang, Y., et al., "AC-PKI: anonymous and certificateless public-key infrastructure for mobile ad hoc networks," IEEE International Conference on Communications, Aug. 15, 2005, XP010825910, 6 pages.

(Continued)

*Primary Examiner* — Ronald B Abelson
(74) *Attorney, Agent, or Firm* — Conley Rose, P.C.

(57) ABSTRACT

A device identifier (ID) obtaining method, a terminal, and a network device, where the method includes sending, by a terminal to a network device, a first message used to obtain a device ID, where the device ID is used to globally identify the terminal uniquely, receiving, by the terminal, an encrypted key pair sent by the network device, where the key pair includes a first public key and a first private key, receiving, by the terminal, information sent by the network device, where the information is used to identify that the first public key is the device ID of the terminal, and determining, by the terminal, that the first public key is the device ID.

20 Claims, 7 Drawing Sheets

(51) Int. Cl.
*H04W 12/06* (2021.01)
*H04W 12/04* (2021.01)
*H04L 9/08* (2006.01)
*H04L 9/32* (2006.01)
*H04W 12/033* (2021.01)
*H04W 12/069* (2021.01)
*H04W 12/0431* (2021.01)

(52) U.S. Cl.
CPC ..... *H04W 12/033* (2021.01); *H04W 12/0431* (2021.01); *H04W 12/069* (2021.01)

(56) References Cited

U.S. PATENT DOCUMENTS

| | | | |
|---|---|---|---|
| 2004/0240669 | A1 | 12/2004 | Kempf et al. |
| 2005/0154889 | A1 | 7/2005 | Ashley et al. |
| 2006/0233359 | A1* | 10/2006 | Jung ............. H04H 20/02 |
| 2007/0111709 | A1* | 5/2007 | De Luca ............. H04W 48/10 |
| 2010/0169648 | A1 | 7/2010 | Yoshida |
| 2017/0111353 | A1 | 4/2017 | Tschache et al. |
| 2017/0169264 | A1 | 6/2017 | Britt et al. |
| 2018/0152293 | A1 | 5/2018 | Ding et al. |

FOREIGN PATENT DOCUMENTS

| | | |
|---|---|---|
| CN | 101710859 A | 5/2010 |
| CN | 102255725 A | 11/2011 |
| CN | 104066078 A | 9/2014 |
| CN | 104955039 A | 9/2015 |
| CN | 106230784 A | 12/2016 |
| CN | 106453330 A | 2/2017 |
| CN | 106533669 A | 3/2017 |
| CN | 106571913 A | 4/2017 |
| CN | 106899410 A | 6/2017 |
| CN | 108390885 B | 8/2018 |
| EP | 1858193 A1 | 11/2007 |
| EP | 3157190 A1 | 4/2017 |
| WO | 2005069531 A1 | 7/2005 |

OTHER PUBLICATIONS

Huawei, Hisilicon, Evaluation of IMSI privacy solutions , 3GPP TSG SA WG3 (Security) Meeting #87, S3-171208, 15 May 19, 2017, Ljubljana, Slovenia, 4 pages.

* cited by examiner

DEVICE IDENTIFIER OBTAINING METHOD AND APPARATUS

CROSS-REFERENCE TO RELATED APPLICATIONS

This application is a continuation of International Patent Application No. PCT/CN2018/100618 filed on Aug. 15, 2018, which claims priority to Chinese Patent Application No. 201810147255.9 filed on Feb. 12, 2018. The disclosures of the aforementioned applications are hereby incorporated by reference in their entireties.

TECHNICAL FIELD

This application relates to the field of communications technologies, and relates to a device identifier (ID) obtaining method and an apparatus, and in particular, to a method for obtaining a device ID of a terminal in the Internet of things (IoT) and an apparatus.

BACKGROUND

The IoT is a network that connects any object to the internet according to an agreed protocol using an information collection device such as radio-frequency identification (RFID), a sensor, an infrared sensor, a Global Positioning System, or a laser scanner, to exchange information and perform communication in order to implement intelligent identification, positioning, tracking, monitoring, and management. The IoT connects various terminals with an information sensing function to an IoT platform using a mobile communications network.

A terminal with an information sensing function may also be referred to as a terminal device, an IoT terminal, or an IoT device. With vigorous development of the IoT industry, many different types of terminals exchange information with a network and an application using a fixed or mobile Internet Protocol (IP) data channel. Therefore, device IDs need to be assigned to the terminals, to help manage the terminals.

In a conventional network, a device ID of a terminal is usually preconfigured. For example, for a mobile terminal, user identity information provided by an operator for the terminal and identification information written into the terminal at delivery are used for calculation to generate an identity of the terminal for authentication of the mobile terminal. For a wired terminal, a network access key provided by the operator and identification information written into the terminal at delivery are used to generate an identity. Different vendors use different configuration manners, and types and specifications of IDs configured by different vendors for a terminal may be different. In addition, different vendors may configure a same ID for different terminals. Therefore, device management in the IoT is complex to some extent.

To configure a globally unique device ID, in other approaches, a mobile terminal is uniquely identified using an International Mobile Equipment Identity (IMEI) or the like, but needs to register with a registration authority in advance. Consequently, a configuration process is relatively complex, registration costs are high, and ID recycling efficiency is low.

Further, because the device ID generated in the foregoing manner is excessively simple, the device ID may be stolen, and is easy to forge when the device ID is stolen or illegally intruded.

As an important step of security management, how to perform trusted authentication on a device and how to generate a unique device ID to facilitate management, simplify a configuration process, and improve security and availability of an overall device ID obtaining scheme become urgent problems to be resolved currently.

SUMMARY

In view of this, embodiments of this application provide a device ID obtaining method, to provide an overall device ID obtaining scheme with higher security and availability.

According to a first aspect, an embodiment of this application provides a device ID obtaining method. The method includes that a terminal sends, to a network device, a first message used to request a device ID for the terminal, where the device ID is used to globally identify the terminal uniquely. The terminal receives an encrypted key pair sent by the network device, where the key pair includes a first public key and a first private key. The terminal receives information sent by the network device, where the information is used to identify that the first public key is the device ID of the terminal. The terminal determines, based on the received key pair and the received information, that the first public key is the device ID.

The key pair sent by the network device and received by the terminal and the information sent by the network device and received by the terminal may be carried in a same message, or may be carried in different messages. When the key pair and the information are carried in a same message, the operation (for ease of description, which is referred to as an operation 1) that the terminal receives an encrypted key pair sent by the network device and the operation (an operation 2) that the terminal receives information sent by the network device may be understood as being completed by a same operation. When the key pair and the information are carried in different messages, the operation 1 may be performed before, after, or at the same time as the operation 2.

In the foregoing solution, the terminal generates the request for obtaining the device ID, and the network device sends the key pair to the terminal based on the received request, and sends the information to the terminal to indicate that the public key included in the key pair is the device ID. Therefore, the network device dynamically assigns the device ID to the terminal based on the request of the terminal and does not need to preconfigure the ID for the terminal, and the terminal does not need to register with a registration authority in advance. This simplifies a configuration process, reduces registration costs, and improves device ID recycling efficiency because there is no need to preconfigure the device ID. In addition, the public key in the key pair is used as the device ID such that uniqueness of the device ID is ensured, and device ID repetition is avoided. Moreover, the device ID based on the public key is more complex than an existing device ID such that a possibility that the device ID is forged because the device ID is excessively simple is reduced.

In a possible design, the method further includes that the terminal sends, to the network device, a second message signed using the first private key, where the second message carries the first public key used as the device ID of the terminal.

In a possible design, the first message carries a second public key, and the second public key is a public key generated by the terminal based on a physical unclonable function (PUF).

In a possible design, that the terminal receives an encrypted key pair sent by the network device includes that the terminal receives the key pair that is sent by the network device and that is encrypted using the second public key. After receiving the key pair that is sent by the network device and that is encrypted using the second public key, the terminal can perform decryption only using a second private key corresponding to the second public key. Because the second public key and the second private key are keys generated by the terminal based on the PUF, and only the terminal stores the second private key, it is difficult to forge the second private key, and transmission security of the key pair can be effectively improved.

In a possible design, after the terminal receives the encrypted key pair sent by the network device, the method further includes that the terminal stores the first private key, and encrypts the stored first private key using the second public key. The stored first private key is encrypted using the second public key, and can be decrypted only using a second private key corresponding to the second public key. Because the second public key and the second private key are generated based on the PUF, and only the terminal has the second private key, it is difficult to forge the second private key, and storage security of the first private key can be effectively ensured.

In a possible design, the first message carries a public key certificate issued by a certificate authority (CA), and the public key certificate carries the second public key. The CA issues the certificate such that the second public key does not need to be deployed in the network device in advance. This simplifies a configuration process.

According to a second aspect, this application provides a device ID obtaining method. The method includes that a first network device receives a first message that is sent by a terminal and that is used to request a device ID for the terminal, where the device ID is used to globally identify the terminal uniquely. The first network device sends an encrypted key pair to the terminal, where the key pair includes a first public key and a first private key. The first network device sends first information to the terminal, where the first information is used to identify that the first public key is the device ID of the terminal. For technical effects of the method provided in the second aspect, refer to descriptions in the first aspect. Details are not described herein again.

The key pair sent by the network device to the terminal and the information sent by the network device to the terminal may be carried in a same message, or may be carried in different messages. When the key pair and the information are carried in a same message, the operation (for ease of description, which is referred to as an operation 1) that the first network device sends an encrypted key pair to the terminal and the operation (an operation 2) that the first network device sends first information to the terminal may be understood as being completed by a same operation. When the key pair and the information are carried in different messages, the operation 1 may be performed before, after, or at the same time as the operation 2.

In a possible design, a device management system is deployed in the first network device, and the first network device receives a second message that is sent by the terminal and that is signed using the first private key, where the second message carries the first public key used as the device ID of the terminal. The second message may be used to report the device ID, that is, information such as the first public key, device status information, device location information, and/or a device type, to the device management system deployed in the first network device. Further, an operation to be performed using the second message may be identified using a message type in the second message or a corresponding bit in the second message. The second message may carry the first public key used as the device ID. After receiving the second message, the first network device may verify the signature using the first public key, to further perform identity verification on the terminal. Therefore, in the foregoing solution, the network device returns the key pair to the terminal based on the request that is for obtaining the device ID and that is sent by the terminal. The terminal uses the public key in the key pair as the device ID, and signs a to-be-sent packet using the private key in the key pair, to perform identity verification on the terminal. Therefore, there is no need to reconfigure a new authentication credential, and in a scenario with many IoT terminals, a configuration process is effectively simplified, and system overheads are reduced.

In a possible design, a device management system is deployed in the first network device, and an ID management system is deployed in a second network device. After the first network device receives the first message, and before the first network device sends the encrypted key pair to the terminal, the method further includes that the first network device sends a third message to the second network device, where the third message is used to request the device ID for the terminal. The first network device receives the key pair and second information that are returned by the second network device, where the second information is used to indicate that the first public key included in the key pair is the device ID.

In a possible design, an ID management system is deployed in the first network device. After receiving the first message carrying the second public key, the first network device performs identity verification on the terminal based on the second public key and a second public key stored in the first network device.

In a possible design, the first message carries a second public key, and the second public key is a public key generated by the terminal based on a PUF.

In an optional design, the third message carries the second public key, and the second network device performs identity verification on the terminal based on the second public key carried in the third message. Further, after receiving the first message carrying the second public key, the first network device obtains the second public key based on the first message, generates the third message carrying the second public key, and sends the third message to the second network device. The second network device performs identity verification on the terminal based on the second public key carried in the third message and a second public key stored in the second network device. If determining that the terminal succeeds in the identity verification, the second network device generates the key pair and the second information, and sends the key pair and the second information to the first network device. If determining that the second public key carried in the third message is the same as the second public key stored in the second network device, the second network device determines that the terminal succeeds in the identity verification.

Identity verification is performed on terminals such that the ID management system assigns a device ID only to a terminal that succeeds in the identity verification. This effectively avoids resource consumption caused when an untrusted terminal applies to the ID management system for a device ID.

In a possible design, that the first network device sends an encrypted key pair to the terminal includes that the first network device sends, to the terminal, the key pair encrypted using the second public key. After receiving the key pair that is sent by the network device and that is encrypted using the second public key, the terminal can perform decryption only using a second private key corresponding to the second public key. Because the second public key and the second private key are keys generated by the terminal based on the PUF, and only the terminal stores the second private key, it is difficult to forge the second private key, and transmission security of the key pair can be effectively improved.

In a possible design, the first message carries a public key certificate issued by a CA, and the public key certificate carries the second public key. The CA issues the certificate such that the second public key does not need to be deployed in the network device in advance. This simplifies a configuration process.

According to a third aspect, an embodiment of this application provides a terminal configured to perform the method in the first aspect or any possible design of the first aspect. Further, the terminal includes modules configured to perform the method in the first aspect or any possible implementation of the first aspect.

According to a fourth aspect, an embodiment of this application provides a network device configured to perform the method in the second aspect or any possible design of the second aspect. Further, the terminal includes modules configured to perform the method in the second aspect or any possible implementation of the second aspect.

According to a fifth aspect, an embodiment of this application provides a terminal, including a transceiver, a processor, and a memory. The transceiver, the processor, and the memory may be connected using a bus system. The memory is configured to store a program, an instruction, or code. The processor is configured to execute the program, the instruction, or the code in the memory, to complete an operation other than information receiving and sending performed by the terminal in the method in the first aspect or any possible design of the first aspect.

According to a sixth aspect, an embodiment of this application provides a network device, including a transceiver, a processor, and a memory. The transceiver, the processor, and the memory may be connected using a bus system. The memory is configured to store a program, an instruction, or code. The processor is configured to execute the program, the instruction, or the code in the memory, to complete an operation other than information receiving and sending performed by the network device in the method in the second aspect or any possible design of the second aspect.

According to a seventh aspect, an embodiment of this application provides a communications system, including the terminal provided in the third aspect or the fifth aspect and the network device provided in the fourth aspect or the sixth aspect.

According to an eighth aspect, an embodiment of this application provides a computer-readable storage medium. The computer-readable storage medium stores an instruction, and when the instruction is run on a computer, the computer is enabled to perform the method in the first aspect or any possible implementation of the first aspect or the method in the second aspect or any possible implementation of the second aspect.

According to the method, the terminal, the network device, and the system that are provided in the embodiments of this application, the key pair is generated, and the public key in the key pair is used as the device ID such that uniqueness of the device ID can be effectively ensured, and especially in a scenario with many IoT devices, a problem of a management difficulty caused by device ID repetition can be effectively avoided. Further, the information sent by the terminal is signed using the private key in the public key pair such that there is no need to preconfigure an authentication credential or negotiate an additional key during communication. Therefore, in a scenario with many terminals, overheads required for configuring an authentication credential and negotiating a key are greatly reduced, a configuration process is greatly simplified, and processing efficiency is improved.

DESCRIPTION OF EMBODIMENTS

Figure 1:
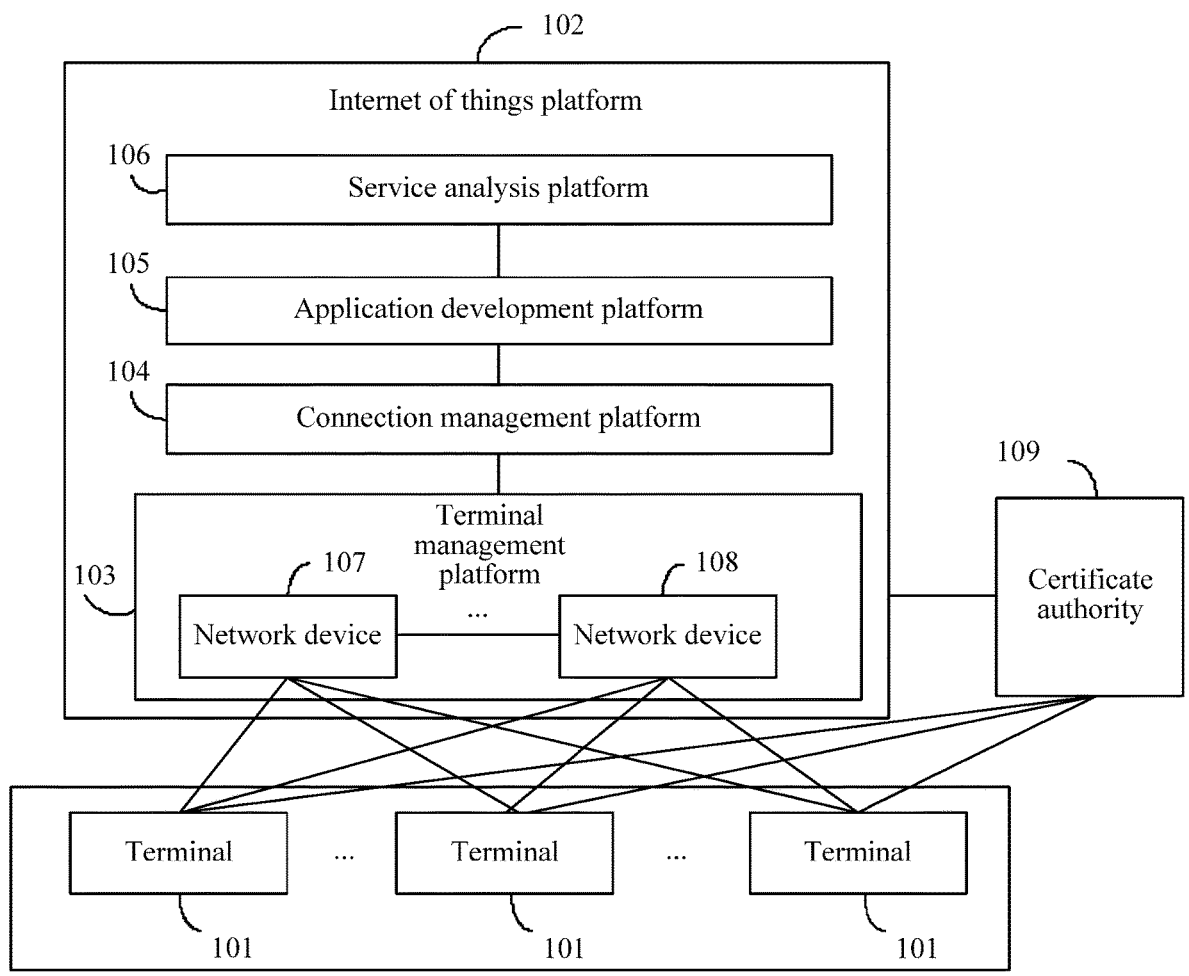
FIG. 1 is a schematic architectural diagram of an IoT system according to an embodiment of this application.

An application scenario described in the embodiments of this application is intended to more clearly describe technical solutions in the embodiments of this application, but is not intended to indicate that the technical solutions provided in the embodiments of this application can be limited only to the application scenario. A person of ordinary skill in the art may understand that, with evolution of network architectures and emergence of new service scenarios, the technical solutions provided in the embodiments of this application are also applicable to a similar technical problem.

Unless otherwise stated, ordinal numbers such as "1", "2", "3", "first", "second", and "third" mentioned in this application are used to distinguish between a plurality of objects, but are not used to limit a sequence of the plurality of objects.

"A and/or B" mentioned in this application should be understood as the following cases: only A is included, only B is included, or both A and B are included.

The following briefly describes some terms in this application, to facilitate understanding of a person skilled in the art.

"PUF" described in this application is a physical unclonable function (PUF), and is a "biological feature" identification technology in the chip field. In a chip manufacturing process, even if two chips have a same design or even a same manufacturing process, physical attributes of the two chips are still different. On a molecular scale, there are always unavoidable and uncontrollable variables that make each chip unique. These variables are completely random and cannot be eliminated. Even on the most advanced production line, there is an internal structure difference between chips on a same wafer. Completely random keys are generated by extracting the variables in the chip manufacturing process based on the PUF. These keys cannot be predicted or scheduled, permanently exist, and cannot be imitated even by chip manufacturers. A PUF-based key generation algorithm may be an existing algorithm such as a Rivest-Shamir-Adelman (RSA) algorithm or a digital signature algorithm (DSA). Details are not described in this application.

"Terminal" in this application may be a device held, managed, or used by an operator or a content service provider, or may be a common user terminal device. "Terminal" may also be referred to as a terminal device, a network device, a node, or a node device. When being applied to the IoT, the terminal may also be referred to as an IoT network node, an IoT terminal, a terminal device, an IoT device, an IoT node device, or an IoT terminal device. In conclusion, any device with an information sensing function may be referred to as a terminal. The terminal may be a device such as a mobile phone (or referred to as a "cellular" phone), a Personal Communications Service (PCS) phone, a cordless phone, a Session Initiation Protocol (SIP) phone set, a wireless local loop (WLL) station, or a personal digital assistant (PDA). Alternatively, the terminal may be, for example, various network devices, which may also be referred to as access network devices, for example, a gNodeB (gNB), a common base station (for example, a NodeB (NB) in a wideband code-division multiple access (CDMA) (WCDMA) system, an evolved NodeB (eNB or eNodeB) in a Long-Term Evolution (LTE) system, or a base transceiver station (BTS) in Global System for Mobile Communications (GSM) or CDMA), a New Radio (NR) controller, a centralized network element (Centralized Unit), a NR base station, a radio remote unit, a mobility management entity (MME), a micro base station, a distributed network element (Distributed Unit), a transmission reception point (TRP) or a transmission point (TP), and a radio controller in a cloud radio access network (CRAN) scenario. Alternatively, the network device may be a relay station, an access point, a vehicle-mounted device, or a network device or any other access device in a future network. However, the embodiments of this application are not limited thereto. Alternatively, the terminal may be a home gateway, an intelligent wearable device (for example, a smart watch, a smart band, smart glasses, a smart headset, a smart helmet, a smart ring, smart shoes, or a smart necklace), various household appliances (for example, a refrigerator, a washing machine, a television, a water heater, a rice cooker, a microwave oven, an oven, a toaster, a footbath, an air purifier, a humidifier, and a speaker), various transportation tools (for example, a car, a plane, a train, a ship, a bicycle, and a motorcycle), various instruments and meters, various network devices (for example, a router, a switch, a server, a firewall, and a controller), or the like. This application is not limited thereto, and no exhaustive enumeration can be provided. Therefore, details are not described.

"IoT platform" described in this application is a relatively broad concept, can perform operations such as integration, sorting, analysis, and feedback on data information collected by an IoT terminal, and mainly performs management on many terminals, data management, operation management, and security management. The IoT platform integrates many advanced technologies, including cloud computing, big data, artificial intelligence, and the like, to meet requirements for performing information transmission and exchange on the IoT. The IoT platform may include a plurality of processing platforms with different functions, and is responsible for extracting data used for control and decision making from perception data based on an application requirement, and converting the data into different formats for sharing among a plurality of application systems. In actual application, the IoT platform may include one or more devices. In terms of a type, the IoT platform may be divided into four types of platforms from bottom to top a terminal management platform, a connection management platform, an application development platform, and a service analysis platform. The terminal management platform is mainly responsible for performing registration management, identity identification, access control, configuration, monitoring, query, system upgrade, troubleshooting, lifecycle management, and the like on the IoT terminal. The connection management platform is mainly responsible for performing configuration and fault management, network resource usage management, connection resource management, package change, number/IP address/media access control (MAC) resource management, and the like on an IoT connection. The application development platform may provide a platform as a service (Paas) platform used for application development and unified data storage, and provide an application development tool, middleware, data storage, a service logic engine, an application platform interface (API) for connecting to a third party, and the like. The service analysis platform is mainly configured to classify and analyze service data, and provide a visual data analysis result. The service analysis platform monitors a device status and gives a warning through real-time dynamic analysis, or analyzes and predicts a service through machine learning.

"Network device" described in this application is used to indicate any hardware that can receive and send information and that can process the information during information exchange. For example, the network device may be a personal computer, a server, a router, or a switch. When being applied to the IoT platform, the network device may be configured to perform some or all functions of the terminal management platform, the connection management platform, the application development platform, and/or the service analysis platform. A device management system and/or an ID management system may be deployed in the network device.

"Device management system" described in this application is deployed in the IoT platform, for example, may be deployed in the foregoing terminal management platform. "Device management system" is a centralized device management system, and is mainly configured to manage (for example, configure, query, and monitor) all devices (for example, terminals) and related service information of the devices. The device management system may be deployed in one or more network devices.

"ID management system" described in this application is deployed in the IoT platform, for example, may be deployed in the foregoing terminal management platform. "ID management system" may be, for example, an identity as a service (IDaas) system, and is configured to manage device ID information of a device (for example, the terminal), for example, create, configure, verify, activate, and query a device ID. The ID management system may be deployed in one or more network devices.

The ID management system and the device management system may be both deployed in a same network device, or may be separately deployed in different network devices. This is not limited in the embodiments of this application.

"IDaas" described in this application may be referred to as identity as a service, or may be referred to as identity and access management as a service, and uses cloud computing infrastructure to securely manage a user identity and access.

"Globally unique public key" described in this application means that a public key generated by any terminal is different from a public key generated by another terminal in a network or a system that includes a plurality of terminals. In other words, no repetition occurs. For example, a terminal 1 generates a public key 1, and another terminal such as a terminal 2 cannot generate, based on a same algorithm or different algorithms, a public key that is the same as the public key 1.

"Globally unique ID" described in this application means that a device ID of any terminal is different from a device ID of another terminal in a network or a system that includes a plurality of terminals. In other words, no repetition occurs.

The public key and the private key are a key pair obtained using a specific algorithm. In other words, a key pair includes a public key and a private key. The public key is a public part in the key pair, and the private key is a private part in the key pair. In this application, "a public key and a private key corresponding to the public key" (or a similar description) indicates that the private key and the public key constitute a key pair. Similarly, "a private key and a public key corresponding to the private key" (or a similar description) also indicates that the private key and the public key constitute a key pair.

FIG. 1 is a schematic diagram of a system architecture of an IoT system according to an embodiment of this application. The IoT system includes a plurality of terminals 101 and an IoT platform 102 communicatively connected to the plurality of terminals 101. The IoT platform 102 includes a terminal management platform 103, a connection management platform 104, an application development platform 105, and a service analysis platform 106. At least one network device is deployed in the terminal management platform 103. Only two network devices (a network device 107 and a network device 108) are used as an example for description in FIG. 1. This should not constitute a limitation on this application. A device management system and an ID management system may be deployed in the network device deployed in the terminal management platform 103. The device management system is configured to manage terminals together, configure the terminals, and check and monitor a terminal status and a service status. The ID management system is configured to generate, update, delete, and/or verify a device ID of a terminal. The device management system and the ID management system may be deployed in a same network device such as the network device 107. Corresponding functions of the device management system and the ID management system may be completed by different chips, or the device management system and the ID management system may be two processes on a same chip. The device management system and the ID management system may alternatively be deployed in different network devices. For example, the device management system is deployed in the network device 107, and the ID management system is deployed in the network device 108. This is not limited in this application. The IoT system may further include a CA 109. The CA is an authority responsible for issuing a certificate, authenticating a certificate, and managing an issued certificate. For example, the CA issues a digital certificate to each terminal that uses a public key. The digital certificate is used to prove that a user listed in the certificate legally owns a public key listed in the certificate. It should be noted that FIG. 1 is merely a schematic diagram, and interaction between the IoT platform and each of the plurality of terminals is merely used as an example for description, and should not constitute a limitation on an application scenario of this application. The IoT system may include another terminal. Functions of the terminal management platform 103, the connection management platform 104, the application development platform 105, and the service analysis platform 106 may be separately performed by different network devices. Alternatively, all functions of the four platforms may be performed by one network device. Alternatively, some functions of the four platforms may be performed by one network device, and the other functions are performed by one or more other network devices. This is not limited in this application. A quantity of terminals and a quantity of network devices are not limited in this embodiment of this application. For example, when there is a plurality of network devices, each network device may manage one or more terminals, or the plurality of network devices may jointly manage one or more terminals.

Although the IoT is used as an example in this application to describe the application scenario of this application, a person skilled in the art may understand that the technical solutions of this application are applicable to various different network scenarios. This is not limited in this application.

Figure 2:
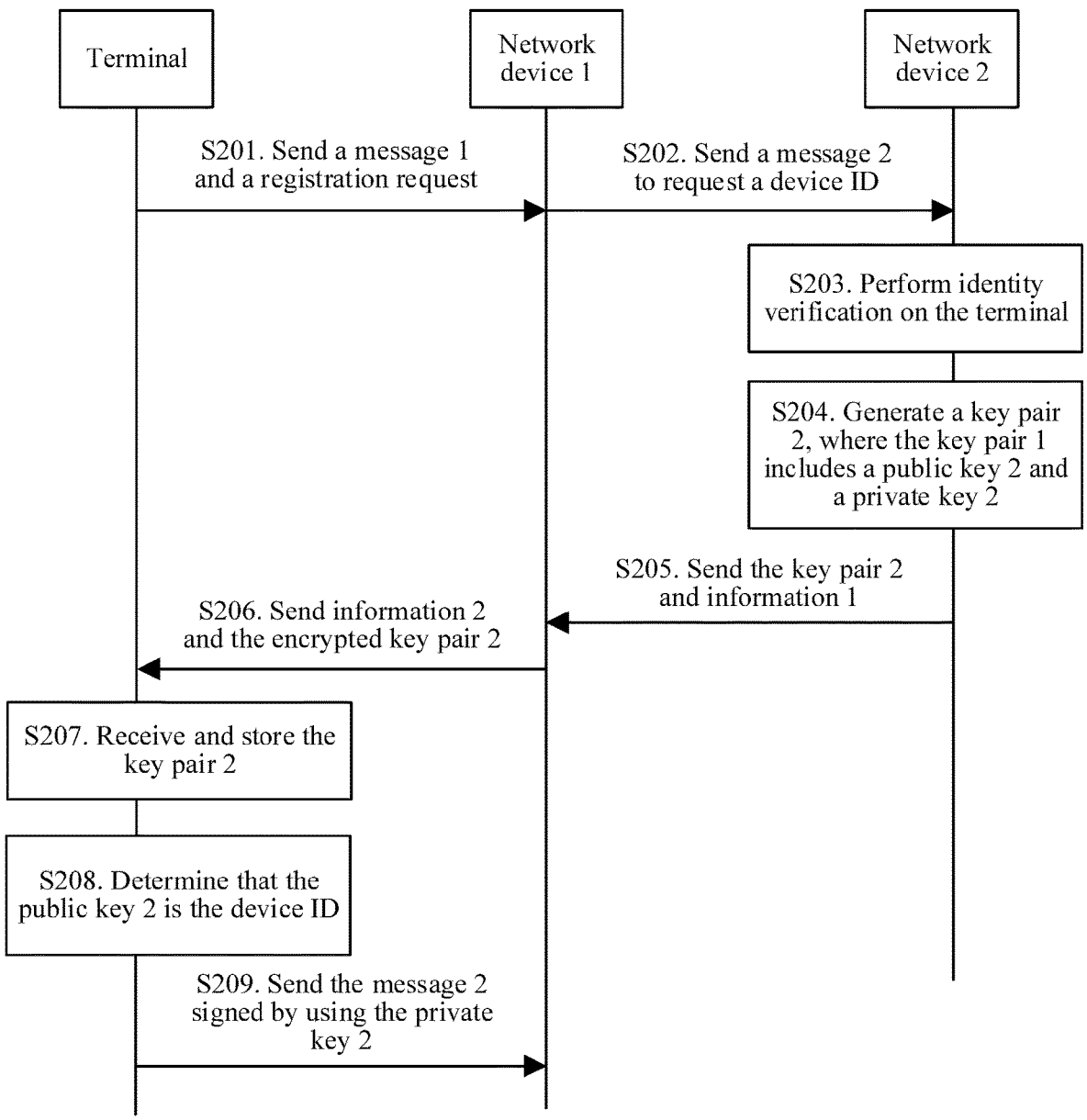
FIG. 2 is a schematic flowchart of a device ID obtaining method according to an embodiment of this application.

FIG. 2 is a schematic flowchart of a device ID obtaining method 200 according to an embodiment of this application. A network architecture to which the method 200 is applied includes at least a terminal, a network device 1, and a network device 2. For example, the terminal may be the terminal 101 in the network architecture shown in FIG. 1, the network device 1 may be the network device 108 that is in the network architecture shown in FIG. 1 and in which the device management system is deployed, and the network device 2 may be the network device 107 that is in the network architecture shown in FIG. 1 and in which the ID management system is deployed. The ID management system may be, for example, an IDaas system. The network architecture may be the network architecture shown in FIG. 1. The method 200 includes the following operations.

S201. The terminal sends a message 1 to the network device 1.

The message 1 is used to send a registration request to the network device 1, and is also used to instruct the network device 1 to request a device ID for the terminal. Further, when the terminal needs to access the IoT, the terminal needs to register with the device management system. A terminal that successfully registers with the device management system may access the IoT to perform a related operation.

S202. The network device 1 sends a message 2 to the network device 2.

The message 2 is used to request a device ID for the terminal. After receiving the message 1, the network device 1 generates the message 2 and sends the message 2 to the network device 2 according to the instruction of the message 1, to request the device ID for the terminal.

The message 1 and the message 2 may be Transmission Control Protocol (TCP) messages, or may be User Datagram Protocol (UDP) messages. For the message 1 and the message 2, it may be identified, using a message type or a corresponding bit, that the message 2 is used to request the device ID.

In a specific implementation, after S202, the method 200 may further include the following step.

S203. The network device 2 performs identity verification on the terminal.

The network device 2 may perform identity verification on the terminal in manners that include but are not limited to the following several manners.

Manner 1:

The network device 2 performs identity verification on the terminal based on an authentication credential negotiated with the terminal. Further, the network device 2 negotiates the authentication credential with the terminal in advance, and locally stores the negotiated authentication credential. When requesting to obtain the device ID, the terminal adds the authentication credential to the message 1. The message 2 sent by the network device 1 to the network device 2 also carries an authentication credential. After receiving the message 2, the network device 2 performs identity verification on the terminal based on the authentication credential carried in the message 2 and the locally stored authentication credential. If the authentication credential carried in the message 2 matches the locally stored authentication credential, it is considered that the terminal succeeds in the identity verification.

Manner 2:

The network device 2 performs identity verification on the terminal based on a globally unique key pair. Further, the terminal generates the globally unique key pair in advance. For example, in a delivery phase of the terminal, the terminal generates, based on a PUF, a key pair 1 including a public key 1 and a private key 1, and a network administrator or a network management system preconfigures the public key 1 in the network device 2. When requesting to obtain the device ID, the terminal adds the public key 1 to the message 1. The message 2 sent by the network device 1 to the network device 2 also carries the public key 1. After receiving the message 2, the network device 2 performs identity verification on the terminal based on the public key 1 carried in the message 2 and the locally stored public key 1. If the public key 1 carried in the message 2 is the same as the public key 1 stored in the network device 2, it is considered that the terminal succeeds in the identity verification.

Manner 3:

The network device 2 performs identity verification on the terminal based on a key certificate. Further, the terminal generates a globally unique key pair in advance. For example, in a delivery phase of the terminal, the terminal generates, based on a PUF, a key pair 1 including a public key 1 and a private key 1. The terminal sends the public key 1 to a CA, and the CA issues a public key certificate, and returns the public key certificate to the terminal. The public key certificate carries the public key 1. The CA issues the public key certificate such that the public key 1 does not need to be preconfigured in the network device 2. This simplifies a configuration process. When requesting to obtain the device ID, the terminal adds the public key certificate to the message 1. The message 2 sent by the network device 1 to the network device 2 also carries the public key certificate. After receiving the message 2, the network device 1 verifies the public key certificate. If the verification succeeds, it is confirmed that the terminal succeeds in the identity verification.

Identity verification is performed on terminals, and especially using the method in the manner 2 or the manner 3 such that the ID management system in the network device 2 assigns a device ID only to a terminal that succeeds in the identity verification. This effectively avoids resource consumption caused when an untrusted terminal applies to the ID management system for a device ID. S203 is not a necessary operation. When S203 is not performed, S204 may be performed after S202.

S204. The network device 2 generates a key pair 2 based on the message 2, where the key pair 2 includes a public key 2 and a private key 2.

S205. The network device 2 sends the key pair 2 and information 1 to the network device 1.

After receiving the message 2, the network device 2 generates the key pair 2 in response to the request of the message 2. The key pair 2 may be generated by the ID management system in the network device 2, and the information 1 is used to identify that the public key 2 is the device ID. The information 1 may be a message type, or may be a corresponding bit in a message. The key pair 2 and the information 1 may be carried in a same message, or may be carried in different messages.

S206. The network device 1 sends information 2 and the encrypted key pair 2 to the terminal.

The information 2 is used to identify that the public key 2 is the device ID. The information 2 may be a message type, or may be a corresponding bit in a message. The key pair 2 and the information 2 may be carried in a same message, or may be carried in different messages.

The network device 1 may encrypt the key pair 2 in manners that include but are not limited to the following manners.

Manner 1: Before S201, for example, in a delivery phase of the terminal, the terminal generates the key pair 1 based on the PUF. The key pair 1 includes the public key 1 and the private key 1. After the terminal generates the key pair 2, the network device 1 may obtain the public key 1 in the following manners.

Manner a: The message 1 carries the public key 1, and the network device 1 extracts the public key 1 from the message 1 and stores the public key 1.

Manner 2: The network administrator or the network management system configures the public key 1 in the network device 1. When sending the key pair 2 to the terminal, the network device 1 performs encryption protection on the key pair 2 using the public key 1. After receiving the key pair 2 encrypted using the public key 1, the terminal performs decryption using the private key 1.

In the manner 1, the network device 1 encrypts the key pair 1 using the public key 2, and the terminal performs decryption using the private key 2 stored in the terminal. Because the public key 2 and the private key 2 are generated based on the PUF, and only the terminal stores the private key 2, it is difficult to forge the private key 2, and transmission security of the key pair 1 can be effectively improved.

Manner 2: The network device 1 negotiates a key with the terminal in advance, and encrypts the key pair 2 using the negotiated key.

S207. The terminal receives and stores the key pair 2.

After receiving the key pair 2, the terminal stores the key pair 2. In a specific implementation, the terminal encrypts the stored key pair 2 using the public key 1 generated based on the PUF, or encrypts only the stored private key 2 using the public key 1. The private key 1 corresponding to the public key 1 is used for decryption. Because the public key 1 and the private key 1 are generated based on the PUF and are difficult to forge, storage security of the private key 2 can be improved. Certainly, the terminal may alternatively perform encryption protection on the key pair 2 or at least the private key 2 using another key or in another manner, to improve storage security of the private key 2.

S208. The terminal determines that the public key 1 is the device ID.

The terminal obtains the key pair 1, and determines, according to the instruction of the information 2, that the public key 1 is the device ID. In this way, the terminal determines that the terminal obtains the device ID of the terminal.

It should be noted that the operation of storing the key pair 2 by the terminal in S207 and the operation in S208 are not performed in sequence. To be specific, the terminal may store the key pair 2 before S208, or may store the key pair 2 after S208, or may store the key pair 2 at the same time when completing the operation in S208.

In a specific implementation manner, after S207, the method 200 may further include the following step.

S209. The terminal sends, to the network device 1, the message 2 signed using the private key 1.

Further, the message 2 may be used to confirm, from the device management system deployed in the network device 1, that the terminal is successfully registered. The message 2 may also be used to report the device ID, that is, information such as the public key 1, device status information, device location information, and/or a device type, to the network device 1. Further, an operation to be performed using the message 2 may be identified using a message type in the message 2 or a corresponding bit in the message 2. The message 2 may carry the public key 1 used as the device ID. After receiving the message 2, the network device 1 may verify the signature of the message 2 using the public key 1, to further perform identity verification on the terminal.

S209 and S208 are not performed in sequence. To be specific, S209 may be performed before S208, or S209 may be performed after S208, or S209 and S208 may be performed at the same time.

In a specific implementation, after S208, the method 200 may further include the following step. The terminal sends, to a network device 3, a message 3 signed using the private key 1.

The network device 3 is a terminal other than the foregoing terminal. The terminal and the network device 3 exchange information with each other. The terminal signs, using the private key 1, information carried in the message 3, and the message 3 carries the public key 1 used as the device ID. After receiving the message 3, the network device 3 may directly extract the public key 1 from the message 3 such that the network device 3 can verify the signature of the message 3 without obtaining the public key 1 in advance, to further perform identity verification on the terminal.

Figure 3:
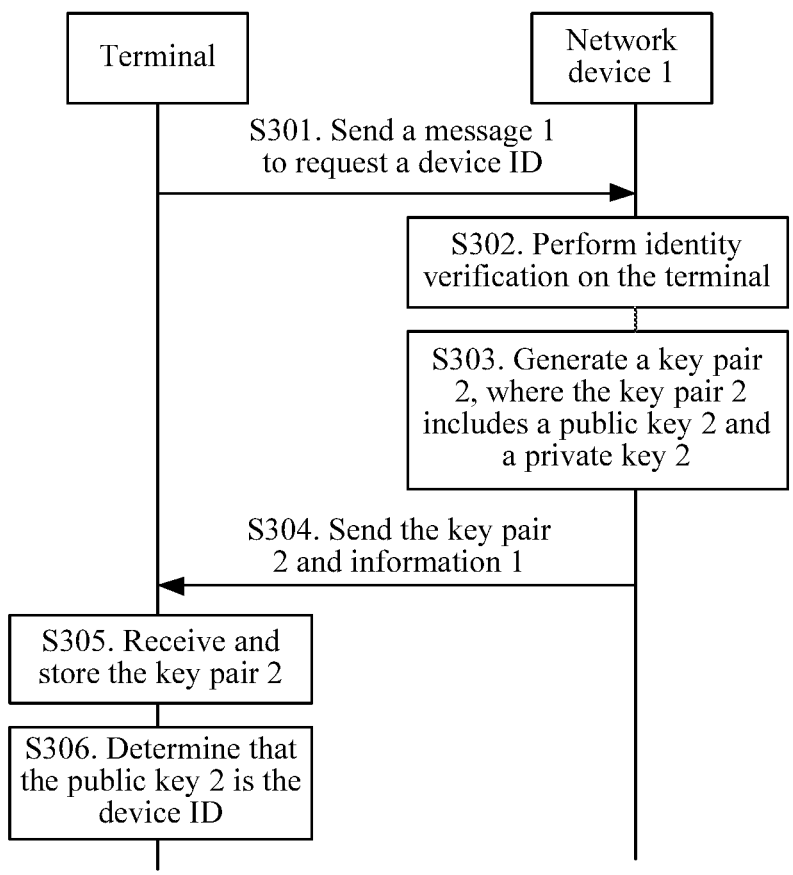
FIG. 3 is a schematic flowchart of a device ID obtaining method according to an embodiment of this application.

FIG. 3 is a schematic flowchart of a device ID obtaining method 300 according to an embodiment of this application. A network architecture to which the method 300 is applied includes at least a terminal and a network device 1. For example, the terminal may be, for example, the terminal 101 in the network architecture shown in FIG. 1, and the network device 1 may be, for example, the network device 107 that is shown in FIG. 1 and in which the ID management system is deployed, or the network device 108 that is shown in FIG. 1 and in which the ID management system is deployed. The ID management system may be, for example, an IDaas system. The network architecture may be the network architecture shown in FIG. 1. The method 300 includes the following operations.

S301. The terminal sends a message 1 to the network device 1.

The message 1 is used to request a device ID for the terminal. For the message 1, it may be identified, using a message type or a corresponding bit, that the message 1 is used to request the device ID.

In a specific implementation, after S301, the method 300 may further include the following step.

S302. The network device 1 performs identity verification on the terminal.

The network device 1 may perform identity verification on the terminal in manners that include but are not limited to the following several manners.

Manner 1: The network device 1 performs identity verification on the terminal based on an authentication credential negotiated with the terminal. Further, the network device 1 negotiates the authentication credential with the terminal, and stores the authentication credential. When requesting to obtain the device ID, the terminal adds the negotiated authentication credential to the message 1. After receiving the message 1, the network device 1 performs identity verification on the terminal based on the authentication credential carried in the message 1 and an authentication credential stored in the network device 1. If the network device 1 determines that the authentication credential carried in the message 1 matches the locally stored authentication credential, it is considered that the terminal succeeds in the identity verification.

Manner 2: The network device 1 performs identity verification on the terminal based on a globally unique key pair. Further, the terminal generates the globally unique key pair in advance. For example, in a delivery phase of the terminal, the terminal generates, based on a PUF, a key pair 1 including a public key 1 and a private key 1, and a network administrator or a network management system preconfigures the public key 1 in the network device 1. When requesting to obtain the device ID, the terminal adds the public key 1 to the message 1. After receiving the message 1, the network device 1 performs identity verification on the terminal based on the public key 1 carried in the message 1 and a stored public key 1. If the public key 1 carried in the message 1 is the same as the public key 1 stored in the network device 1, it is considered that the terminal succeeds in the identity verification.

Manner 3: The network device 1 performs identity verification on the terminal based on a key certificate. Further, the terminal generates a globally unique key pair in advance. For example, in a delivery phase of the terminal, the terminal generates, based on a PUF, a key pair 1 including a public key 1 and a private key 1. The terminal sends the public key 1 to a CA for certificate issuing, and the CA issues a public key certificate, and returns the public key certificate to the terminal. The public key certificate carries the public key 1. The CA issues the public key certificate such that the public key 1 does not need to be preconfigured in the network device 1. This simplifies a configuration process. When requesting to obtain the device ID, the terminal adds the public key certificate to the message 1. After receiving the message 1, the network device 1 verifies the public key certificate carried in the message 1. If the verification succeeds, it is confirmed that the terminal succeeds in the identity verification.

Identity verification is performed on terminals such that an ID management system in a network device 1 assigns a device ID only to a terminal that succeeds in the identity verification. This effectively avoids resource consumption caused when an untrusted terminal applies to the ID management system for a device ID. S302 is not a necessary operation. When S302 is not performed, S303 is performed after S301.

S303. The network device 1 generates a key pair 2, where the key pair 2 includes a public key 2 and a private key 2.

S304. The network device 1 sends the encrypted key pair 2 and information 1 to the terminal.

After receiving the message 1, the network device 1 generates the key pair 2 in response to the request of the terminal. The key pair 2 may be generated by the ID management system in the network device 1, and the information 1 is used to identify that the public key 2 is the device ID. The information 1 may be a message type, or may be a corresponding bit in a message. The key pair 2 and the information 1 may be carried in a same message, or may be carried in different messages.

A method for encrypting the key pair 2 by the network device 1 is similar to the method for encrypting the key pair 2 by the network device 1 in the method 200. For details, refer to related descriptions of S206 in the method 200. Details are not described herein again.

S305. The terminal receives and stores the key pair 2.

After receiving the key pair 2, the terminal stores the key pair 2. In a specific implementation, the terminal encrypts the stored key pair 2 using the public key 1 generated based on the PUF, or encrypts only the stored private key 2 using the public key 1. The private key 1 corresponding to the public key 1 is used for decryption. Because the public key 1 and the private key 1 are generated based on the PUF and are difficult to forge, storage security of the private key 2 can be improved. Certainly, the terminal may alternatively perform encryption protection on the key pair 2 or at least the private key 2 using another key or in another manner, to improve storage security of the private key 2.

S306. The terminal determines that the public key 2 is the device ID.

The terminal obtains the key pair 1, and determines, according to the instruction of the information 1, that the public key 2 is the device ID. In this way, the terminal obtains the device ID of the terminal.

It should be noted that the operation of storing the key pair 2 by the terminal in S305 and the operation in S306 are not performed in sequence. To be specific, the terminal may store the key pair 2 before S306, or may store the key pair 2 after S306, or may store the key pair 2 at the same time when completing the operation in S306.

Figure 4:
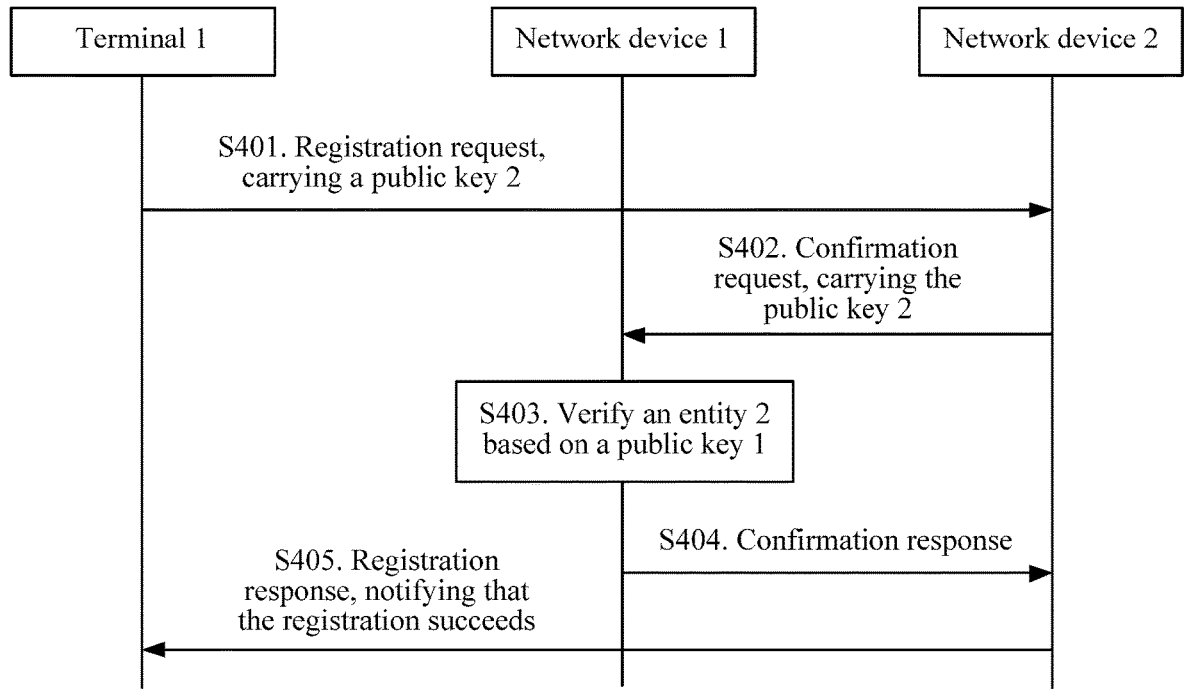
FIG. 4 is a schematic flowchart of a terminal registration method according to an embodiment of this application.

FIG. 4 is a schematic flowchart of a terminal registration method 400 according to an embodiment of this application.

In a specific implementation, the method 400 may be performed after S305 in the method 300. The following describes the method 400 with reference to FIG. 4. The method 400 includes the following operations.

S401. A terminal sends a registration request to a network device 2, where the registration request carries a public key 2 used as a device ID. The network device 2 and a network device 1 are deployed in a same network architecture, and a device management system is deployed in the network device 2. For example, the network device 1 may be the network device 108 in the network architecture shown in FIG. 1, and the network device 2 may be the network device 107 in the network architecture shown in FIG. 1.

S402. After receiving the registration request, the network device 2 sends a confirmation request to the network device 1, where the confirmation request carries the public key 2, and the confirmation request is used to confirm whether the terminal has registered with the network device 1.

S403. The network device 1 receives the confirmation request, and verifies, based on a locally stored public key 2 and the public key 2 carried in the confirmation request, whether the terminal is registered. Further, the network device 1 may query whether the public key 1 of the terminal is stored in an ID management system. If the public key 2 is stored in the ID management system, it indicates that the network device 1 has configured the device ID for the terminal. In other words, it indicates that the terminal has registered with the ID management system.

S404. The network device 1 confirms that the terminal is successfully registered, and sends a confirmation response to the network device 2 to indicate, to the network device 2, that the terminal is successfully registered.

S405. After receiving the confirmation response, the network device 2 may send a registration response to the terminal to notify that the terminal successfully registers with the network device 2.

Figure 5:
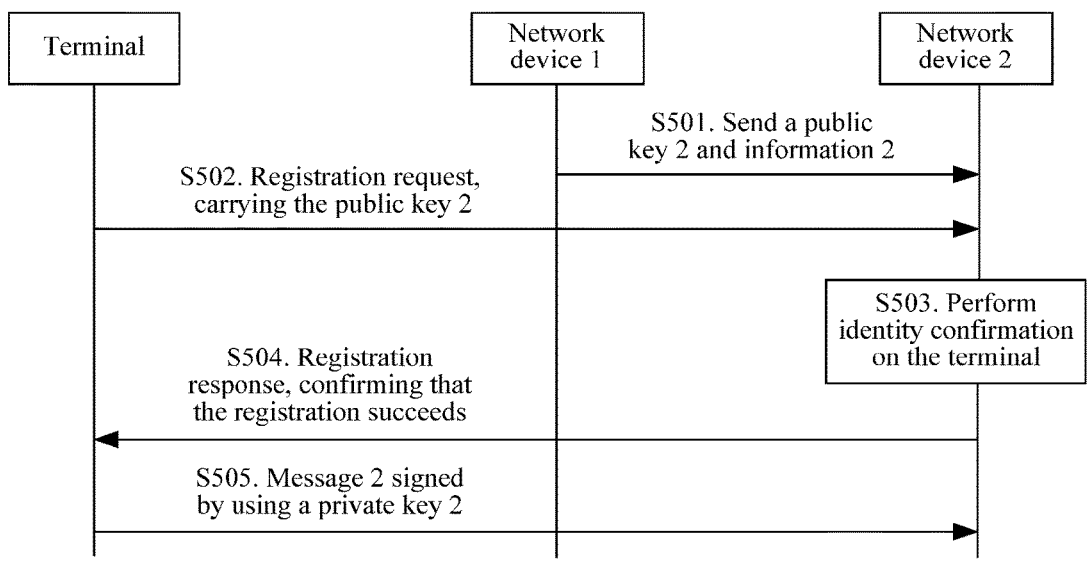
FIG. 5 is a schematic flowchart of a terminal registration method according to an embodiment of this application.

FIG. 5 is a schematic flowchart of another terminal registration method 500 according to an embodiment of this application.

In a specific implementation, the method 500 may be performed after S303 in the method 300. The following describes the method 500 with reference to FIG. 5. The method 500 includes the following operations.

S501. A network device 1 sends a public key 2 and information 2 to a network device 2.

The information 2 is used to indicate that a public key 2 is a device ID. For example, information 2 may be a message type, or may be a corresponding bit in a message. The public key 2 and the information 2 may be carried in a same message, or may be carried in different messages. The network device 2 and a network device 1 are deployed in a same network architecture, and a device management system is deployed in the network device 2. For example, the network device 1 may be the network device 108 in the network architecture shown in FIG. 1, and the network device 2 may be the network device 107 in the network architecture shown in FIG. 1. After receiving the public key 2, the network device 2 confirms, according to the instruction of the information 2, that the public key 2 is the device ID. The network device 2 stores the public key 2, for example, stores the public key 2 in a database of the device management system.

S502. The network device 2 receives a registration request sent by a terminal, where the registration request carries a public key 2 used as the device ID.

S503. The network device 2 verifies the terminal based on the stored public key 2 and the public key 2 in the registration request.

If the network device confirms that the stored public key 2 is the same as the public key 2 in the registration request, it is considered that the terminal succeeds in the verification.

S504. The network device sends a registration response to the terminal to indicate that the terminal is successfully registered.

After S504, the method 500 may further include the following step.

S505. The terminal sends, to the network device 2, a message 2 signed using a private key 2.

The message 2 may be used to confirm, from the network device 2, that the terminal is successfully registered. The message 2 may also be used to report the device ID, that is, information such as the public key 2, device status information, device location information, and/or a device type, to the device management system deployed in the network device 2. Further, an operation to be performed using the message 2 may be identified using a message type in the message 2 or a corresponding bit in the message 2. The message 2 may carry the public key 2 used as the device ID. After receiving the message 2, the network device 2 may verify the signature of the message 2 using the public key 2, to further perform identity verification on the terminal.

It should be noted that an operation sequence of S501 and S304 to S306 is not limited in this embodiment of this application. For example, S501 may be completed before S304, or may be completed after S304, or may be completed at the same time as S304, S501 may be completed before S305, or may be completed after S305, or may be completed at the same time as S305, or S501 may be completed before S306, or may be completed after S306, or may be completed at the same time as S306. S502 is performed after S306.

In a specific implementation, after S504, the method 500 may further include the following step.

S505. The terminal sends, to a network device 3, a message 3 signed using the private key 2.

The network device 3 may be a terminal other than the foregoing terminal. The terminal and the network device 3 exchange information with each other. The terminal signs, using the private key 2, information carried in the message 3, and the message 3 carries the public key 2 used as the device ID. After receiving the message 3, the network device 3 may directly extract the public key 2 from the message 3 such that the network device 3 can verify the signature of the message 3 without obtaining the public key 2 in advance, to further perform identity verification on the terminal.

Figure 6:
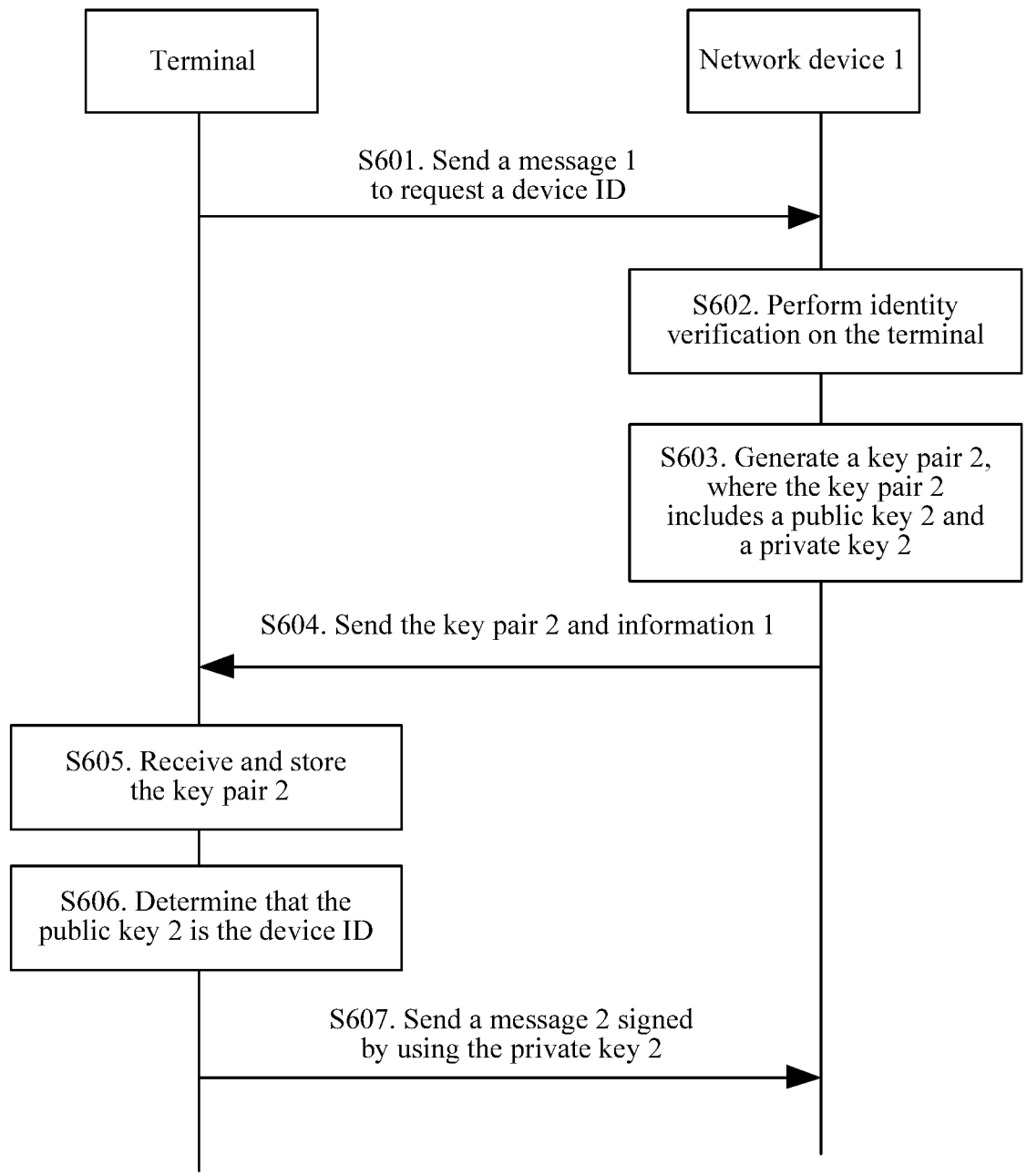
FIG. 6 is a schematic flowchart of a device ID obtaining method according to an embodiment of this application.

FIG. 6 is a schematic flowchart of a device ID obtaining method 600 according to an embodiment of this application. A network architecture to which the method 600 is applied includes at least a terminal and a network device 1. For example, the terminal may be the terminal 101 shown in FIG. 1, and the network device 1 may be the network device 107 or the network device 108 in the network architecture shown in FIG. 1. A device management system and an ID management system are deployed in the network device 1, and the ID management system may be, for example, an IDaas system. The network architecture may be the network architecture shown in FIG. 1. The method 600 includes the following operations.

S601. The terminal sends a message 1 to the network device 1.

The message 1 is used to request a device ID for the terminal from the ID management system and send a registration request to the device management system. For the message 1, it may be identified, using a message type or a corresponding bit, that the message 1 is used to request the device ID for the terminal and register with the device management system.

In a specific implementation, after S601, the method 600 may further include the following step.

S602. The network device 1 performs identity verification on the terminal.

A manner in which the network device 1 performs identity verification on the terminal is the same as the manner in which the network device 1 performs identity verification on the terminal in the method 300. For details, refer to related descriptions of S302 in the method 300. Details are not described herein again.

Identity verification is performed on terminals such that an ID management system in a network device 1 assigns a device ID only to a terminal that succeeds in the identity verification. This effectively avoids resource consumption caused when an untrusted terminal applies to the ID management system for a device ID. S602 is not a necessary operation. When S602 is not performed, S603 is performed after S601.

S603. The network device 1 generates a key pair 2, where the key pair 2 includes a public key 2 and a private key 2.

S604. The network device 1 sends the encrypted key pair 2 and information 1 to the terminal.

After receiving the information 1, the network device 1 generates the key pair 2 in response to the request of the terminal. The key pair 2 may be generated by the ID management system in the network device 1. The information 1 is used to identify that the public key 2 is the device ID. The information 1 may be a message type, or may be a corresponding bit in a message. The key pair 2 and the information 1 may be carried in a same message, or may be carried in different messages.

A method for encrypting the key pair 2 by the network device 1 is similar to the method for encrypting the key pair 2 by the network device 1 in the method 200. For details, refer to related descriptions of S206 in the method 200. Details are not described herein again.

S605. The terminal receives and stores the key pair 2.

After receiving the key pair 2, the terminal stores the key pair 2. In a specific implementation, the terminal encrypts the stored key pair 2 using a public key 1 generated based on a PUF, or encrypts only the stored private key 2 using a public key 1. A private key 1 corresponding to the public key 1 is used for decryption. Because the public key 1 and the private key 1 are generated based on the PUF and are difficult to forge, storage security of the private key 2 can be improved. Certainly, the terminal may alternatively perform encryption protection on the key pair 2 or at least the private key 2 using another key or in another manner, to improve storage security of the private key 2.

S606. The terminal determines that the public key 2 is the device ID.

The terminal obtains a key pair 1, and determines, according to the instruction of the information 1, that the public key 2 is the device ID.

It should be noted that the operation of storing the key pair 2 by the terminal in S605 and the operation in S606 are not performed in sequence. To be specific, the terminal may store the key pair 2 before S606, or may store the key pair 2 after S606, or may store the key pair 2 at the same time when completing the operation in S606.

In a specific implementation, after S606, the method 600 may further include the following step.

S607. The terminal sends, to the network device 1, a message 2 signed using the private key 2.

Further, the message 2 may be used to confirm, from the device management system deployed in the network device 1, that the terminal is successfully registered. The message 2 may also be used to report the device ID, that is, information such as the public key 2, device status information, device location information, and/or a device type, to the network device 1. Further, an operation to be performed using the message 2 may be identified using a message type in the message 2 or a corresponding bit in the message 2. The message 2 may carry the public key 2 used as the device ID. After receiving the message 2, the network device 1 may verify the signature of the message 2 using the public key 2, to further perform identity verification on the terminal.

In a specific implementation, after S606, the method 600 may further include the following step, where the terminal sends, to a network device 3, a message 3 signed using the private key 2.

The network device 3 may be a terminal other than the foregoing terminal. The terminal and the network device 3 exchange information with each other. The terminal signs, using the private key 2, information carried in the message 3, and the message 3 carries the public key 2 used as the device ID. After receiving the message 3, the network device 3 may directly extract the public key 2 from the message 3 such that the network device 3 can verify the signature of the message 3 without obtaining the public key 2 in advance, to further perform identity verification on the terminal.

Figure 7:
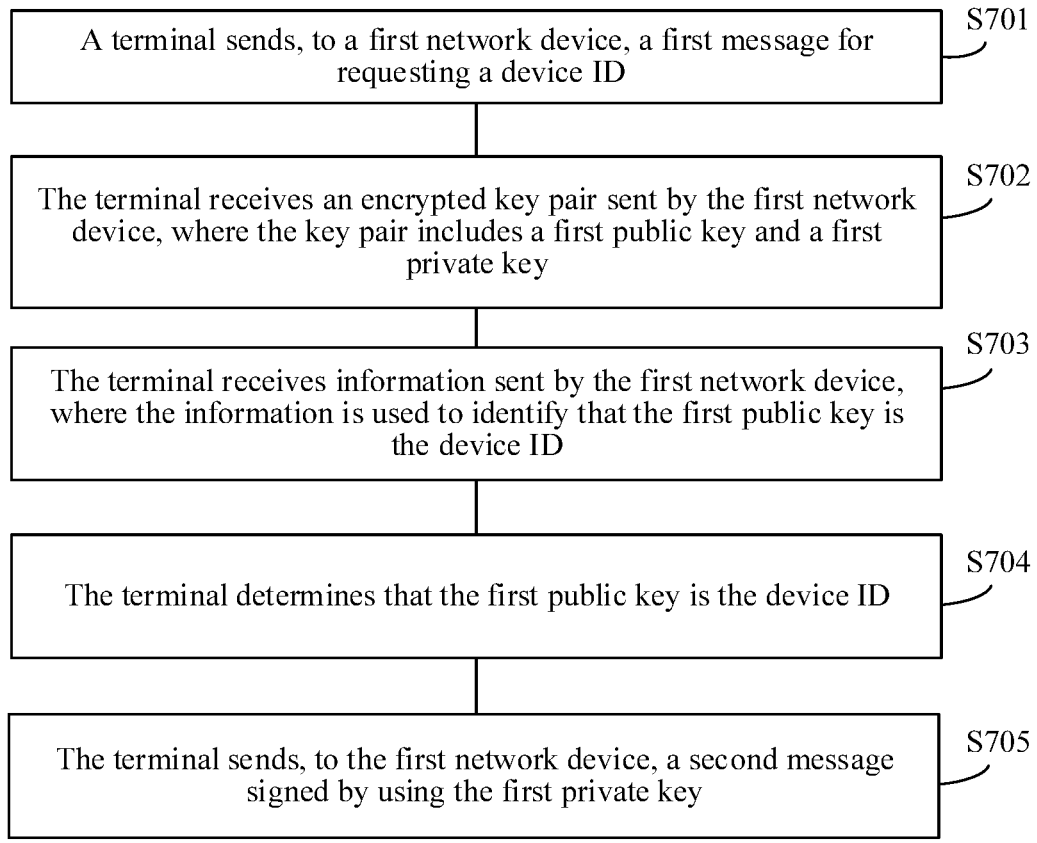
FIG. 7 is a schematic flowchart of a device ID obtaining method according to an embodiment of this application.

FIG. 7 is a schematic flowchart of another device ID obtaining method 700 according to an embodiment of this application. A network architecture to which the method 700 is applied includes at least a terminal and a first network device. For example, the terminal may be the terminal 101 in the network architecture shown in FIG. 1, and the first network device may be the network device 108 in the network architecture shown in FIG. 1. A device management system and/or an ID management system are/is deployed in the first network device. The network architecture may be the network architecture shown in FIG. 1. The method 700 includes the following operations.

S701. A terminal sends, to the first network device, a first message used to request a device ID for the terminal, where the device ID is used to globally identify the terminal uniquely.

The first message may be a TCP message, or may be a UDP message. For the first message, it may be identified, using a message type or a corresponding bit, that the first message is used to request the device ID.

S702. The terminal receives an encrypted key pair sent by the first network device, where the key pair includes a first public key and a first private key.

For a method for encrypting the key pair by the first network device, refer to related descriptions of encrypting the key pair 2 by the network device 1 in S206 in the method 200. Details are not described herein again.

S703. The terminal receives information sent by the first network device, where the information is used to identify that the first public key is the device ID of the terminal.

The information may be a message type, or may be a corresponding bit in a message. The information sent in S703 and the key pair sent in S702 may be carried in one message, or may be carried in different messages.

The key pair received by the terminal in S702 and the information received by the terminal in S703 may be carried in a same message, or may be carried in different messages. When the key pair and the information are carried in a same message, S702 and S703 may be understood as being completed by a same operation, or may be understood as being completed by two operations. When the key pair and the information are carried in different messages, S703 may be performed before, after, or at the same time as S702.

S704. The terminal determines that the first public key is the device ID.

The terminal obtains the key pair and the information, and determines, according to the instruction of the information, that the first public key is the device ID. In this way, the terminal determines that the terminal obtains the device ID of the terminal.

In a specific implementation, a device management system is deployed in the first network device, and the method 700 may further include the following step.

S705. The terminal sends, to the first network device, a second message signed using the first private key, where the second message carries the first public key used as the device ID of the terminal.

The second message may be used to confirm, from the device management system deployed in the first network device, that the terminal is successfully registered. The second message may also be used to report the device ID, that is, information such as the first public key, device status information, device location information, and/or a device type, to the first network device. Further, an operation to be performed using the second message may be identified using a message type in the second message or a corresponding bit in the second message. The second message may carry the first public key used as the device ID. After receiving the second message, the first network device may verify the signature of the second message using the first public key, to further perform identity verification on the terminal.

In an implementation, the first message carries a second public key, and the second public key is a public key generated by the terminal based on a PUF.

The terminal may generate, based on the PUF, the second public key and a second private key before S701, for example, in a delivery phase of the terminal. A network administrator or a network management system may preconfigure a second public key in a network device in which an ID management system is deployed. Alternatively, the terminal sends the second public key to a CA, and the CA issues a certificate, and returns an issued public key certificate to the terminal. The CA issues the certificate such that the second public key does not need to be deployed in the network device in advance. This simplifies a configuration process. That the first message carries a second public key includes that the first message directly carries the second public key, or the first message carries the public key certificate issued by the CA, where the public key certificate carries the second public key. When requesting to obtain the device ID, the terminal adds the second public key to the first message. If an ID management system is deployed in the first network device, the first network device performs identity verification on the terminal based on the second public key carried in the first message and a second public key stored in the first network device. If no ID management system is deployed in the first network device, but only a device management system is deployed in the first network device, after the first network device receives the first message sent by the terminal, the first network device generates the second message carrying the second public key, and sends the second message to a second network device. An ID management system is deployed in the second network device, and the second network device stores a second public key. After receiving the second message, the second network device performs identity verification on the terminal based on the second public key carried in the second message and the second public key stored in the second network device.

In an implementation, that the terminal receives an encrypted key pair sent by the first network device includes the following.

The terminal receives the key pair that is sent by the first network device and that is encrypted using the second public key.

After receiving the key pair that is sent by the first network device and that is encrypted using the second public key, the terminal can perform decryption only using the second private key corresponding to the second public key. Because the second public key and the second private key are keys generated by the terminal based on the PUF, and only the terminal stores the second private key, it is difficult to forge the second private key, and transmission security of the key pair can be effectively improved.

In an implementation, after the terminal receives the encrypted key pair sent by the first network device, the method further includes the following.

The terminal stores the first private key, and encrypts the stored first private key using the second public key.

The first private key is used to sign a subsequent packet to be sent by the terminal, and the stored first private key is encrypted using the second public key such that storage security of the first private key can be effectively ensured.

Figure 8:
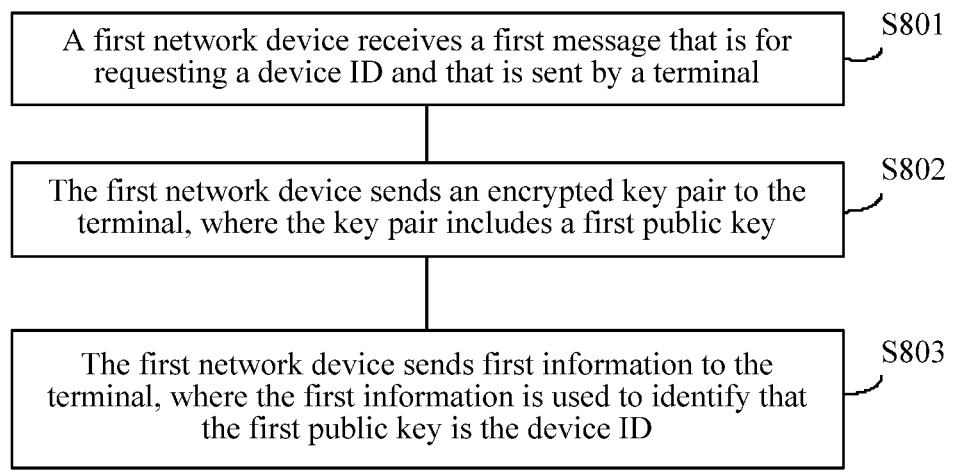
FIG. 8 is a schematic flowchart of a device ID obtaining method according to an embodiment of this application.

FIG. 8 is a schematic flowchart of still another device ID obtaining method 800 according to an embodiment of this application. A network architecture to which the method 800 is applied includes at least a terminal and a first network device. For example, the terminal may be the terminal 101 in the network architecture shown in FIG. 1, and the first network device may be the network device 108 in the network architecture shown in FIG. 1. A device management system and/or an ID management system are/is deployed in the first network device. The network architecture may be the network architecture shown in FIG. 1. The method 800 includes the following operations.

S801. The first network device receives a first message that is sent by the terminal and that is used to request a device ID for the terminal, where the device ID is used to globally identify the terminal uniquely.

The first message may be a TCP message, or may be a UDP message. For the first message, it may be identified, using a message type or a corresponding bit, that the first message is used to request the device ID.

S802. The first network device sends an encrypted key pair to the terminal, where the key pair includes a first public key and a first private key.

For a method for encrypting the key pair by the first network device, refer to related descriptions of encrypting the key pair 2 by the network device 1 in S206 in the method 200. Details are not described herein again.

S803. The first network device sends first information to the terminal, where the first information is used to identify that the first public key is the device ID of the terminal.

The first information may be a message type, or may be a corresponding bit in a message.

The key pair sent in S802 and the first information sent in S803 may be carried in a same message, or may be carried in different messages. When the key pair and the information are carried in a same message, S802 and S803 may be understood as being completed by a same operation. When the key pair and the information are carried in different messages, S803 may be performed before, after, or at the same time as S802.

The first private key is used by the terminal to sign a second message sent by the first network device, and the second message carries the first public key used as the device ID of the terminal.

In a specific implementation, a device management system is deployed in the first network device. The second message may be used to confirm, from the device management system deployed in the first network device, that the terminal is successfully registered. The second message may also be used to report the device ID, that is, information such as the first public key, device status information, device location information, and/or a device type, to the first network device. Further, an operation to be performed using the second message may be identified using a message type in the second message or a corresponding bit in the second message. The second message may carry the first public key used as the device ID. After receiving the second message, the first network device may verify the signature of the second message using the first public key, to further perform identity verification on the terminal.

In an implementation, the first message carries a second public key, and the second public key is a public key generated by the terminal based on a PUF.

Before sending the first information to the first network device, for example, in a delivery phase of the terminal, the terminal generates the second public key and a second private key based on the PUF. A network administrator or a network management system may preconfigure the second public key in a network device in which an ID management system is deployed. Alternatively, the terminal sends the second public key to a CA, and the CA issues a certificate, and returns an issued public key certificate to the terminal. The CA issues the certificate such that the second public key does not need to be deployed in the network device in advance. This simplifies a configuration process. That the first message carries a second public key includes that the first message directly carries the second public key, or the first message carries the public key certificate issued by the CA, where the public key certificate carries the second public key. When requesting to obtain the device ID, the terminal adds the second public key to the first message.

In a specific implementation, an ID management system is deployed in the first network device. After generating the second public key, the terminal may configure the second public key for the first network device using the network administrator or the network management system. When requesting to obtain the device ID, the terminal adds the second public key to the first message. After receiving the first message, the first network device performs identity verification on the terminal based on the second public key carried in the second message and a second public key stored in the first network device. If determining that the second public key carried in the third message is the same as the second public key stored in the first network device, the first network device determines that the terminal succeeds in the identity verification.

In another specific implementation, a device management system is deployed in the first network device, and no ID management system is deployed in the first network device. After the first network device receives the first message, and before the first network device sends the encrypted key pair to the terminal, the method further includes the following.

The first network device generates a third message, where the third message carries the second public key, and the second public key is used by the second network device to perform identity verification on the terminal.

The first network device sends the third message to the second network device, where the third message carries the second public key, and the second public key is used by the second network device to perform identity verification on the terminal.

The first network device receives the key pair and second information that are sent by the second network device, where the second information is used to indicate that the first public key included in the key pair is the device ID.

The ID management system is deployed in the second network device. After generating the second public key, the terminal may configure the second public key for the second network device using the network administrator or the network management system. When requesting to obtain the device ID, the terminal adds the second public key to the first message. After receiving the first message, the first network device generates the third message, and sends the third message to the second network device. The second network device receives the third message, and performs identity verification on the terminal based on the second public key carried in the third message and a second public key stored in the second network device. If determining that the second public key carried in the third message is the same as the second public key stored in the second network device, the second network device determines that the terminal succeeds in the identity verification.

In an implementation, that the first network device sends an encrypted key pair to the terminal includes that the first network device sends, to the terminal, the key pair encrypted using the second public key.

According to the method provided in the embodiments of this application, the key pair is generated, and the public key in the key pair is used as the device ID such that uniqueness of the device ID can be effectively ensured, and especially in a scenario with many IoT devices, a problem of a management difficulty caused by device ID repetition can be effectively avoided. Further, the information sent by the terminal is signed using the private key in the public key pair such that there is no need to preconfigure an authentication credential or negotiate an additional key during communication. Therefore, in a scenario with many terminals, overheads required for configuring an authentication credential and negotiating a key are greatly reduced, a configuration process is greatly simplified, and processing efficiency is improved.

The device ID obtaining method provided in the embodiments of this application in the specification is described above with reference to FIG. 2 to FIG. 8. A terminal and a network device that correspond to the foregoing method embodiments are described below with reference to FIG. 9 and FIG. 10.

Figure 9:
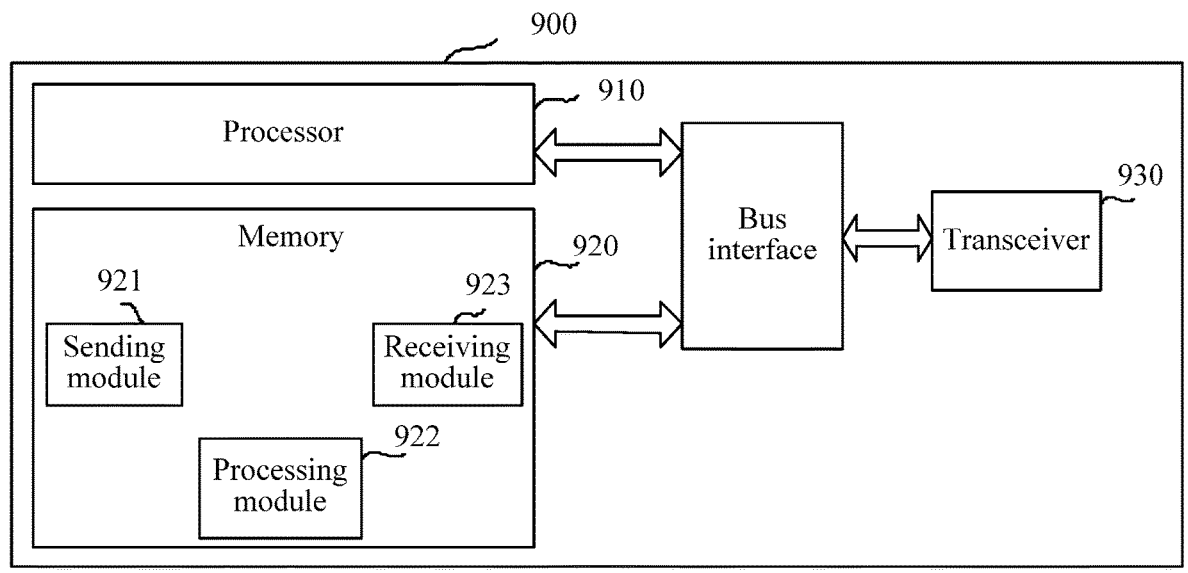
FIG. 9 is a schematic structural diagram of a terminal according to an embodiment of this application.

FIG. 9 is a schematic diagram of a terminal 900 according to an embodiment of this application. The terminal 900 may be applied to the network architecture shown in FIG. 1, for example, may be the terminal 101 in the network architecture shown in FIG. 1. As shown in FIG. 9, the terminal 900 may include a processor 910, a memory 920 coupled to the processor 910, and a transceiver 930. The processor 910 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex PLD (CPLD), a field programmable gate array (FPGA), generic array logic (GAL), or any combination thereof. The processor 910 may be one or more processors. The memory 920 may be a volatile memory such as a random-access memory (RAM), or may be a non-volatile memory such as a read-only memory (ROM), a flash memory, a hard disk drive (HDD), or a solid-state drive (SSD), or may be a combination of the foregoing types of memories. In an implementation, the memory 920 may include a plurality of software modules, for example, a sending module 921, a processing module 922, and a receiving module 923. By executing an instruction in the foregoing software module, the processor 910 may be configured to perform a plurality of operations. The memory 920 may be one or more memories. In some implementations, when one module is configured to perform one operation, it may indicate that the processor 910 is configured to execute the instruction in the module to complete the foregoing operation. By executing the instruction in the memory 920, the processor 910 may perform some or all of the operations performed by the terminal in the method 200, 300, 400, 500, 600, 700, or 800. For example, the processor 910 may send, to the network device 1 using the transceiver 930, the message 1 for requesting the device ID, receive, using the transceiver 930, the key pair including the public key 1 and the private key 1 and the information identifying that the public key 1 is the device ID, where the key pair and the information are sent by the network device 1, and determine, based on the received key pair and the received information, that the public key 1 is the device ID of the terminal.

The sending module 921 is configured to send, to a network device, a first message used to request a device ID for the terminal, where the device ID is used to globally identify the terminal uniquely. The receiving module 923 is configured to receive an encrypted key pair sent by the network device, where the key pair includes a first public key and a first private key, and receive information sent by the network device, where the information is used to identify that the first public key is the device ID of the terminal. The processing module 922 is configured to determine that the first public key is the device ID.

The sending module 921 is further configured to send, to the network device, a second message signed using the first private key, where the second message carries the first public key used as the device ID of the terminal.

In a specific implementation, the first message carries a second public key, and the second public key is a public key generated by the terminal based on a PUF. The receiving module 923 is further configured to receive the key pair that is sent by the network device and that is encrypted using the second public key.

Figure 10:
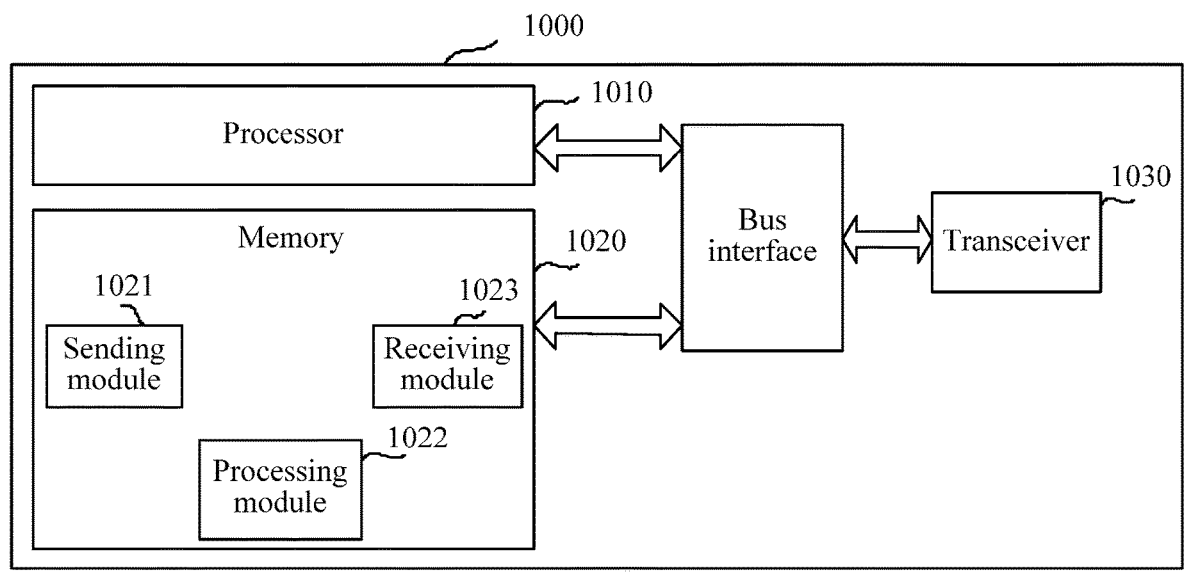
FIG. 10 is a schematic structural diagram of a network device according to an embodiment of this application.

FIG. 10 is a schematic diagram of a network device 1000 according to an embodiment of this application. The network device 1000 may be applied to the network architecture shown in FIG. 1, for example, may be the network device 107 or the network device 108 in the network architecture shown in FIG. 1. As shown in FIG. 10, the network device 1000 may include a processor 1010, a memory 1020 coupled to the processor 1001, and a transceiver 1030. The processor 1010 may be a CPU, an NP, or a combination of a CPU and an NP. The processor may further include a hardware chip. The hardware chip may be an ASIC, a PLD, or a combination thereof. The PLD may be a CPLD, an FPGA, GAL, or any combination thereof. The processor 1010 may be one or more processors. The memory 1020 may be a volatile memory such as a RAM, or may be a non-volatile memory such as a ROM, a flash memory, an HDD, or an SSD, or may be a combination of the foregoing types of memories. In an implementation, the memory 1020 may include a plurality of software modules, for example, a sending module 1021, a processing module 1022, and a receiving module 1023. By executing an instruction in the foregoing software module, the processor 1010 may be configured to perform a plurality of operations. The memory 1020 may be one or more memories. In some implementations, when one module is configured to perform one operation, it may indicate that the processor 1010 is configured to execute the instruction in the module to complete the foregoing operation. In an implementation, by executing the instruction in the memory 1020, the processor 1010 may perform some or all of the operations performed by the network device 1 in the method 200, 300, 400, 500, or 600 and some or all of the operations performed by the first network device in the method 700 or the method 800. For example, the processor 1010 may receive, using the transceiver 1030, the message 1 that is for requesting the device ID and that is sent by the terminal, and send, to the terminal using the transceiver 1030, the key pair including the public key 1 and the private key 1 and the information identifying that the public key 1 is the device ID.

The receiving module 1023 is configured to receive a first message that is sent by a terminal and that is used to request a device ID for the terminal, where the device ID is used to globally identify the terminal uniquely. The sending module 1021 is configured to send an encrypted key pair to the terminal, where the key pair includes a first public key and a first private key. The sending module 1021 is further configured to send first information to the terminal, where the first information is used to identify that the first public key is the device ID of the terminal.

In an implementation, the receiving module 1023 is further configured to receive a second message that is sent by the terminal and that is signed using the first private key, where the second message carries the first public key used as the device ID of the terminal.

In an implementation, the first message carries a second public key, and the second public key is a public key generated by the terminal based on a PUF.

In an implementation, after the receiving module 1023 receives the first message, and before the sending module 1021 sends the encrypted key pair to the terminal, the processing module 1022 is further configured to generate a third message, where the third message carries the second public key, and the second public key is used by a second network device to perform identity verification on the terminal, send the third message to the second network device, and receive the key pair and second information that are sent by the second network device, where the second information is used to indicate that the first public key included in the key pair is the device ID.

In an implementation, the processing module 1022 is further configured to send, to the terminal, the key pair encrypted using the second public key.

In an implementation, the first message carries a public key certificate issued by a CA, and the public key certificate carries the second public key.

In an implementation, by executing the instruction in the memory 1020, the processor 1010 may also perform all or some of the operations performed by the network device 2 in the method 200, the network device 2 in the method 400 or the method 500, and the network device 1 in the method 600, or all of the operations performed by the second network device in the method 800.

In the embodiments of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. A bus interface may be further included in FIG. 9 to FIG. 10, and the bus interface may include any quantity of interconnected buses and bridges. Further, various circuits of one or more processors represented by the processor and memories represented by the memory are linked together. The bus interface may further link various other circuits together, for example, a peripheral device, a voltage regulator, and a power management circuit. This is well known in the art, and therefore is not further described in the specification. The bus interface provides an interface. The transceiver provides a unit for communicating with various other devices on a transmission medium. The processor is responsible for bus architecture management and common processing. The memory may store data used when the processor performs an operation.

This application further provides a communications system, including a terminal and a network device. The terminal may be the terminal provided in the embodiment corresponding to FIG. 9. The network device may be the network device provided in the embodiment corresponding to FIG. 10. The communications system is configured to perform the method in any one of the embodiments in FIG. 2 to FIG. 8.

A person skilled in the art may be further aware that various steps (step) listed in the embodiments of this application may be implemented using electronic hardware, computer software, or a combination thereof. Whether the functions are implemented using hardware or software depends on particular applications and a design requirement of the entire system. A person of ordinary skill in the art may use various methods to implement the described functions for each particular application, but it should not be considered that the implementation goes beyond the scope of the embodiments of this application.

Steps of the methods or algorithms described in the embodiments of this application may be directly embedded into hardware, a software unit executed by a processor, or a combination thereof. The software unit may be stored in a RAM, a flash memory, a ROM, an erasable programmable ROM (EPROM), an electrically EPROM (EEPROM), a register, a hard disk, a removable magnetic disk, a compact disc (CD) ROM (CD-ROM), or a storage medium of any other form in the art. For example, the storage medium may be connected to the processor such that the processor can read information from the storage medium and write information into the storage medium. The storage medium may be further integrated into the processor.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in the specification, modules and method operations may be implemented by electronic hardware or a combination of computer software and electronic hardware. Whether the functions are performed by hardware or software depends on particular applications and design constraint conditions of the technical solutions. A person skilled in the art may use different methods to implement the described functions for particular applications.

It may be clearly understood by a person skilled in the art that, for the purpose of convenient and brief description, for a detailed working process of the foregoing system, apparatus, and module, refer to a corresponding process in the foregoing method embodiments. Details are not described herein again.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

All parts in the specification are described in a progressive manner. Same or similar parts in the implementations may be mutually referenced. Each implementation focuses on a difference from another implementation. Especially, apparatus and system embodiments are basically similar to a method embodiment, and therefore are described briefly. For related parts, refer to corresponding descriptions in the method embodiment.

According to the foregoing description of the specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application. The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device identifier (ID) obtaining method implemented by a terminal, wherein the device ID obtaining method comprises:
   sending, to a network device, a first message requesting a device ID for the terminal, wherein the device ID identifies the terminal;
   receiving an encrypted key pair from the network device, wherein the encrypted key pair comprises a first public key and a first private key; and
   receiving information from the network device, wherein the information identifies that the first public key is the device ID.

2. The device ID obtaining method of claim 1, further comprising sending, to the network device, a second message signed using the first private key, wherein the second message carries the first public key used as the device ID.

3. The device ID obtaining method of claim 1, wherein before sending the first message, the device ID obtaining method further comprises generating a second public key based on a physical unclonable function (PUF), and wherein the first message carries the second public key.

4. The device ID obtaining method of claim 3, wherein the encrypted key pair is encrypted with the second public key.

5. The device ID obtaining method of claim 3, wherein after receiving the encrypted key pair, the device ID obtaining method further comprises:
   storing the first private key; and
   encrypting the first private key using the second public key.

6. The device ID obtaining method of claim 3, wherein the first message carries a public key certificate of a certificate authority (CA), and wherein the public key certificate carries the second public key.

7. A device identifier (ID) obtaining method implemented by a first network device, wherein the device ID obtaining method comprises:
   receiving, from a terminal, a first message requesting a device ID for the terminal, wherein the device ID identifies the terminal;
   sending an encrypted key pair to the terminal, wherein the encrypted key pair comprises a first public key and a first private key; and
   sending first information to the terminal,
   wherein the first information identifies that the first public key is the device ID.

8. The device ID obtaining method of claim 7, further comprises: comprising receiving a second message that is signed using the first private key from the terminal, wherein the second message carries the first public key used as the device ID.

9. The device ID obtaining method of claim 7, wherein the first message carries a second public key, and wherein the second public key is a public key that is based on a physical unclonable function (PUF).

10. The device ID obtaining method of claim 9, wherein after receiving the first message and before sending the encrypted key pair to the terminal, the device ID obtaining method further comprises:
    generating a third message carrying the second public key;
    sending the third message to a second network device to enable the second network device to perform identity verification on the terminal using the second public key; and
    receiving the encrypted key pair and second information from the second network device, wherein the second information indicates that the first public key comprised in the encrypted key pair is the device ID.

11. The device ID obtaining method of claim 9, further comprising sending, to the terminal, the encrypted key pair that is encrypted using the second public key.

12. The device ID obtaining method of claim 9, wherein the first message carries a public key certificate of a certificate authority (CA), and wherein the public key certificate carries the second public key.

13. A terminal comprising:
    a memory comprising instructions; and
    a processor coupled to the memory, wherein the instructions cause the processor to be configured to:
        send, to a network device, a first message requesting a device identifier (ID) for the terminal, wherein the device ID identifies the terminal;
        receive an encrypted key pair from the network device, wherein the key pair comprises a first public key and a first private key; and
        receive information from the network device, wherein the information identifies that the first public key is the device ID.

14. The terminal of claim 13, wherein the instructions further cause the processor to be configured to send, to the network device, a second message that is signed using the first private key, and wherein the second message carries the first public key used as the device ID.

15. The terminal of claim 13, wherein the instructions further cause the processor to be configured to generate a second public key based on a physical unclonable function (PUF), and wherein the first message carries the second public key.

16. The terminal of claim 15, wherein the instructions further cause the processor to be configured to receive, from the network device, the encrypted key pair that is encrypted using the second public key.

17. The terminal of claim 15, wherein the instructions further cause the processor to be configured to:

store the first private key; and encrypt the first private key using the second public key.

18. The terminal of claim 15, wherein the first message carries a public key certificate of a certificate authority (CA), and wherein the public key certificate carries the second public key.

19. A network device, comprising:

a memory comprising instructions; and a processor coupled to the memory, wherein the instructions cause the processor to be configured to:

receive, from a terminal, a first message requesting a device ID for the terminal, wherein the device ID globally identifies the terminal uniquely;

send an encrypted key pair to the terminal, wherein the key pair comprises a public key and a private key; and send information to the terminal, wherein the first information identifies that the public key is the device ID of the terminal.

20. The network device of claim 19, wherein the instructions further cause the processor to be configured to receive, from the terminal, a second message that is signed using the private key, and wherein the second message carries the public key used as the device ID.

* * * * *

UNITED STATES PATENT AND TRADEMARK OFFICE
CERTIFICATE OF CORRECTION

PATENT NO. : 11,350,286 B2
APPLICATION NO. : 16/990528
DATED : May 31, 2022
INVENTOR(S) : Chong Zhou et al.

It is certified that error appears in the above-identified patent and that said Letters Patent is hereby corrected as shown below:

In the Claims

Claim 8, Column 28, Line 19: "comprises: comprising" should read "comprising"

Signed and Sealed this
Nineteenth Day of July, 2022

Katherine Kelly Vidal
*Director of the United States Patent and Trademark Office*